United States Patent [19]

Tanaka et al.

[11] Patent Number: 5,204,941
[45] Date of Patent: Apr. 20, 1993

[54] ELEMENT CHECKING SYSTEM FOR USE IN FORWARD INFERENCE SYSTEM

[75] Inventors: Toshiyuki Tanaka, Yamatokoriyama; Shigeki Kuga, Nara; Nobuo Nakamura, Yamatokoriyama; Taro Morishita, Soraku; Masahiro Wada, Nara, all of Japan

[73] Assignee: Sharp Kabushiki Kaisha, Osaka, Japan

[21] Appl. No.: 505,028

[22] Filed: Apr. 5, 1990

Related U.S. Application Data

[63] Continuation-in-part of Ser. No. 250,695, Sep. 28, 1988, abandoned.

[30] Foreign Application Priority Data

Sep. 30, 1987 [JP] Japan ............................ 62-248547

[51] Int. Cl.$^5$ ............................................. G06F 15/18
[52] U.S. Cl. ............................................. 395/64; 395/51
[58] Field of Search ............................................. 395/64

[56] References Cited

U.S. PATENT DOCUMENTS 4,890,240 12/1989 Loeb et al. ...................... 364/513

OTHER PUBLICATIONS

Hamacher et al., Computer Organization, 2nd ed., McGraw-Hill, 1984, pp. 288-303.
Forgy, C. L., "Rete: A Fast Algorithm for the Many Pattern/Many Object Pattern Match Problem", Artificial Intelligence, 1982, 17-37.
Schor et al., "Advances in Rete Pattern Matching", Proc. 1986 AAAI Conf., 1986, pp. 226-232.
Miranker, D. P., "Treat: A Better Match Algorithm for AI Production Systems", Proc. 1987 AAAI Conf., 1987, 42-47.

Primary Examiner—Michael R. Fleming
Assistant Examiner—Robert W. Downs

[57] ABSTRACT

An element checking system for use in forward inference system is disclosed. When checking elements, each element is read out as a token and transmitted through a checking network. The element checking system includes memory for storing an element checking network. The network has a plurality of inputs for receiving the tokens one at a time, and a plurality of nodes for checking features of the received token. The system also includes working memory for storing elements, each element carrying data identifying a particular node from which the checking procedure in the networks starts. An additional memory is included which stores a pattern table including a plurality of different patterns with a pattern number assigned to each pattern, and a linking table including a pattern number and a corresponding node number for designating a starting node number for an element having a corresponding one of the plurality of patterns. Through the use of the pattern and linking table, an efficient element checking system utilizing a minimum number of nodes can be achieved.

3 Claims, 10 Drawing Sheets

| PATTERN NUMBER | PATTERN NAME | NUMBER OF ATTRIBUTES | STARTING NODE | 1ST ATTRIBUTE | 2ND ATTRIBUTE | 3RD ATTRIBUTE |
|---|---|---|---|---|---|---|
| 1 | APE | 2 | #1 | PLACE | WEIGHT | |
| 2 | THING | 3 | NONE | HEIGHT | WIDTH | WEIGHT |
| 3 | STATUS | 2 | NONE | MOVEMENT | THING | |
| 4 | THING | 2 | #2 | PLACE | NAME | |

| ELEMENT NUMBER | PATTERN NUMBER | 1ST PAIR | | 2ND PAIR | | 3RD PAIR | |
|---|---|---|---|---|---|---|---|
| | | ATTRIBUTE TYPE | VALUE | ATTRIBUTE TYPE | VALUE | ATTRIBUTE TYPE | VALUE |
| 1 | 1 | LETTERS | ROOM1 | NUMERAL | 30 | | |
| 2 | 2 | NUMERAL | 10 | NUMERAL | 100 | NUMERAL | 100 |
| 3 | 4 | LETTERS | ROOM1 | LETTERS | BANANA | | |
| 4 | 3 | LETTERS | JUMP | LETTERS | APE | | |

| ELEMENT NUMBER | PATTERN NUMBER | 1ST PAIR | | 2ND PAIR | | 3RD PAIR | | STARTING NODE |
|---|---|---|---|---|---|---|---|---|
| | | ATTRIBUTE TYPE | VALUE | ATTRIBUTE TYPE | VALUE | ATTRIBUTE TYPE | VALUE | |
| 1 | 1 | LETTERS | ROOM1 | NUMERAL | 30 | | | #1 |
| 2 | 2 | NUMERAL | 10 | NUMERAL | 100 | NUMERAL | 100 | NONE |
| 3 | 4 | LETTERS | ROOM1 | LETTERS | BANANA | | | #2 |
| 4 | 3 | LETTERS | JUMP | LETTERS | APE | | | NONE |

ELEMENT CHECKING SYSTEM FOR USE IN FORWARD INFERENCE SYSTEM

CROSS-REFERENCE TO RELATED APPLICATIONS

This application is a continuation-in-part application of U.S. patent application Ser. No. 07/250,695, filed Sep. 28, 1988, now abandoned, entitled "Element Checking System for Use in Forward Inference System".

BACKGROUND OF THE INVENTION

1. Field of the Invention

The present invention relates to a forward inference system processed by a computer and, more particularly, to an improved element checking system for checking different elements which are used in the forward inference system, and a method therefor.

2. Description of the Prior Art

The forward inference system is developed, for example, for a production system which makes a decision based on a number of known facts which are stored as elements of a working memory in a computer. The decision which is made by the forward inference system is to produce a new fact in a form of new element which is added to the working memory, to delete or revise a particular fact, i.e., element, from the working memory, to start a new program or to produce an alarm, or any other system control which the computer may perform.

The production system is constructed by three different statements, each of which will be explained below.

The first one is a pattern formatting statement for providing various patterns to be stored in a pattern memory. It is assumed that the following patterns are made.

literalize Ape (Place Weight)
  literalize thing (Name Place)
  literalize Status (Movement Thing)
  literalize Thing (Height Width Weight)

In each of the above statements, "literalize" indicates to prepare the pattern that follows. According to the example given above, the first pattern statement is for "Ape". Here, "Ape" represents the pattern name and each of "Place" and "Weight" represents attributes. According to the second example, "Thing" is the pattern name and "Name" and "Place" are the attributes. According to the third example, "Status" is the pattern name and "Movement" and "Thing" are the attributes. According to the fourth example, "Thing" is the pattern name and "Height", "Width" and "Weight" are the attributes.

The second statement is the element of a fact. Each element is constructed by a pattern name and one or more pairs of attribute and value. The pattern name is defined by the above-mentioned pattern making procedure. Two examples of the element are shown below.

Ape (Place: Room 1)
  Thing (Name: Banana, Place: Room 1)

The first example has the element name Ape and one attribute-value pair. The attribute is Place and its value is Room 1. This element tells, for example, a fact that "an ape is in the Room 1", according to the previously determined interpreting rule.

The second example has the element name Thing and two attribute-value pairs. In the first attribute-value pair, the attribute is Name and its value is Banana. In the second attribute-pair, the attribute is Place and its value is Room 1. This element tells, for example, a fact that "a thing in the Room 1 is banana", according to the previously determined interpreting rule. The fact will be stored in the working memory as the production system reads the program.

The third statement consists of IF-THEN rules called production rules. An example of the production rule, which is called "Ape Eats Banana", shown below.

If facts given by the following elements.
  Ape (Place: $ Room)
  Thing (Name: Banana, Place: $ Room)
are satisfied, then, make a new fact given by the following element
  Status (Movement: eat, Thing: banana).

The above IF-THEN rule is symbolically shown below.

IF
    Ape (Place: $ Room)
    Thing (Name: Banana, Place: $ Room)
  THEN,
    MAKE Status (Movement: eat, Thing: banana).

In the IF-THEN rules, the elements appearing after the "IF" statement are called "condition elements". In the above example, condition elements are "Ape (Place: $ Room)" and "Thing (Name: Banana, Place: $ Room)". Here, the symbol $ indicates that the value is variable. Thus, the value of the Place attribute of the first element is equal to the value of the Place attribute of the second element. The newly produced element by the above given IF-THEN statement tells, for example, a fact that "banana is eaten". Thus the "Ape Eats Banana" production rule can be interpreted such that, when the conditions "an ape is in a room" and "a banana is in the same room" are satisfied, it is inferred that "banana is eaten". The inferred fact is then added to the working memory to further infer some other new fact or some new step.

According to the forward inference system, the condition element of the rule and the element in the working memory are compared. Thus, it takes time to find a proper combination between the existing rule and the element in the working memory.

For example, if the rules are compared with existing elements in the order of elements stored in memory, it is necessary to carry out the comparison repeatedly; The number of such a comparison will be increased by (number of rules) × (elements in the working memory), each time the element in the working memory is added or deleted. Thus, an enormous amount of time is needed for the element checking.

To solve this, an improved method has been proposed, according to which, only the rules with elements which correspond to the newly added, deleted or converted element in the working memory are checked, provided that the rule has been previously converted to the network.

Figure 1:
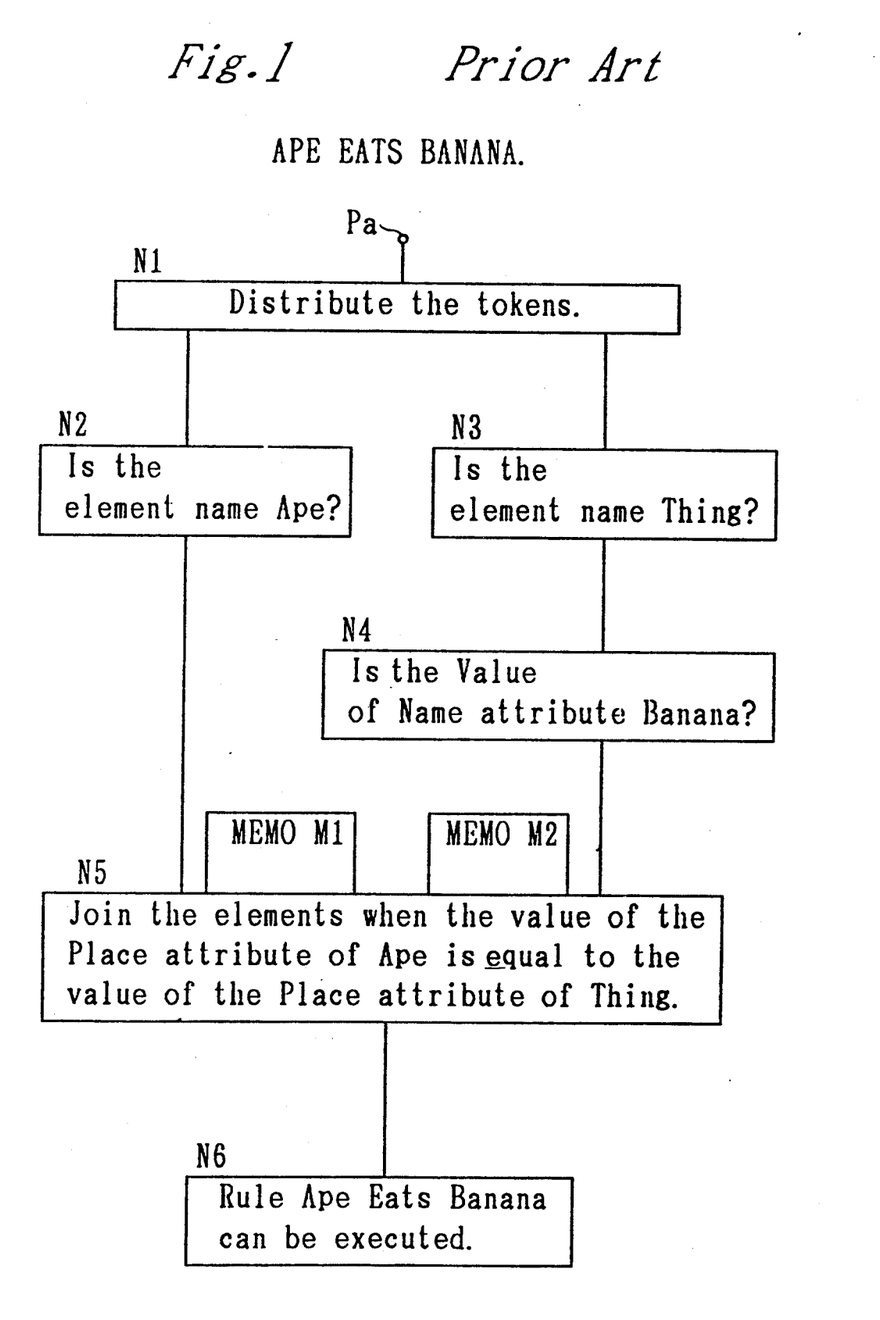
FIG. 1 is a diagrammatic view of the element checking network according to the prior art.

In order to prosecute the production rule, elements are checked by a network having nodes linked together. The prior art network for the production rule, Ape Eats Banana, is shown in FIG. 1. The elements taken out from the working memory and passed into the network are called tokens. The network shown in FIG. 1 consists of: distribution node N1 which has one input Pa for receiving tokens one at a time and a plurality of outputs, such as two outputs in the case shown in FIG. 1; element name check nodes N2 and N3 for checking the element name; attribute check node N4; value check node N5; and terminal node N6. During the check process in the network, many features of the element are checked. The features can be divided into two classes. The first class, which is called intra-element feature, is the one that involves only one element. In the above example of FIG. 1, nodes N2, N3 and N4 are provided to check the intra-element features. The second class, which is called inter-element features, is the one that involve two or more elements. In FIG. 1, node N5 is provided to check the inter-element feature. Therefore, node N5 is coupled with memories M1 and M2 for storing codes representing the elements which have arrived at Node N5 from nodes N2 and N4, respectively.

In operation, the distribution node N1 receives a token through input Pa from the working memory and distributes it to element name check node N2 at which point it is checked whether the element name is Ape or not. If not, the token is rejected and sent back to distribution node N1 which then sends the token to next element name check node N3. The element check is carried out until the correct name of the applied token is found. When the correct element name of the applied token is not found, the token is expelled from the network, and the next token enters the network.

If the entered token has the element name, Ape, the token is transferred from node N1 to node N2 and further to node N5 at which point a code representing the element Ape is stored in memory M1 and then, the token is expelled from the network since there is no element Thing stored therein to carry out the check of node N5.

If the next entered token has the element name, Thing, the token is transferred through nodes N1, N2, N1, N3, N4 and N5. At node N5, a code representing the element Thing is stored in memory M2 and then, it is checked whether or not the value of the Place attribute of the element Ape, which is called by the code stored in memory M1, is equal to the value of the Place attribute of the element Thing. When these Place attributes have the same value, such as $ Room, these elements are joined so as to enable the execution of the production rule "Ape Eats Banana".

Usually, the forward inference system has a plurality of rules. Thus, for the newly added element in the working memory, there will be a plurality of rules for the execution of the production. Of all the possible rules, one rule is selected and the network is processed for producing a new element. If "Ape eat Banana" is selected and executed, a newly produced element will be produced by the production rule; It is then added to the working memory and is checked through the networks for checking various rules.

Thus, according to the prior art forward inference system, the element check is carried out such that, in the first level (node N1) of the network, the token is distributed sequentially to different element name check nodes; Further, in the second level (nodes N2 and N3) of the network, the name of the distributed token is checked one at a time. In the third level (nodes N4 and N5) of the network, the attribute and its value, if any, are checked. In the fourth level (node N6) of the network, a decision is made so as to execute the production rule.

According to the prior art element checking system, there is such a disadvantage that it takes a long time before the network produces a decision. Particularly, the execution carried out in the first level takes a long time, because even the tokens which do not have the corresponding element name in the second level are also executed.

SUMMARY OF THE INVENTION

The present invention has been developed with a view to substantially solving the above described disadvantage and has for its essential object to provide an improved element checking system which can execute the check through the network in a period shorter than that needed for the prior art element checking system.

According to the present invention, the element checking system comprises means for storing element checking network, which has a plurality of inputs for receiving the tokens one at a time, and a plurality of nodes for checking features of the received token. The element checking system further comprises means for storing elements, each element carrying data identifying a particular node from which the checking procedure in the networks starts.

Also, according to the present invention, an element checking method comprises the steps of storing an element checking network, which network has a plurality of inputs for receiving the tokens one at a time, and a plurality of nodes for checking features of the received token; the step of storing elements, each element carrying data identifying a particular node from which the checking procedure in the networks starts; and the step of sending each token to the particular node in the network to start check the token.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which:

FIGS. 10a and 10b taken together as shown in FIG. 10 is a flow chart showing the steps of a subroutine for making nodes in the network.

DESCRIPTION OF THE PREFERRED EMBODIMENT

Figure 2:
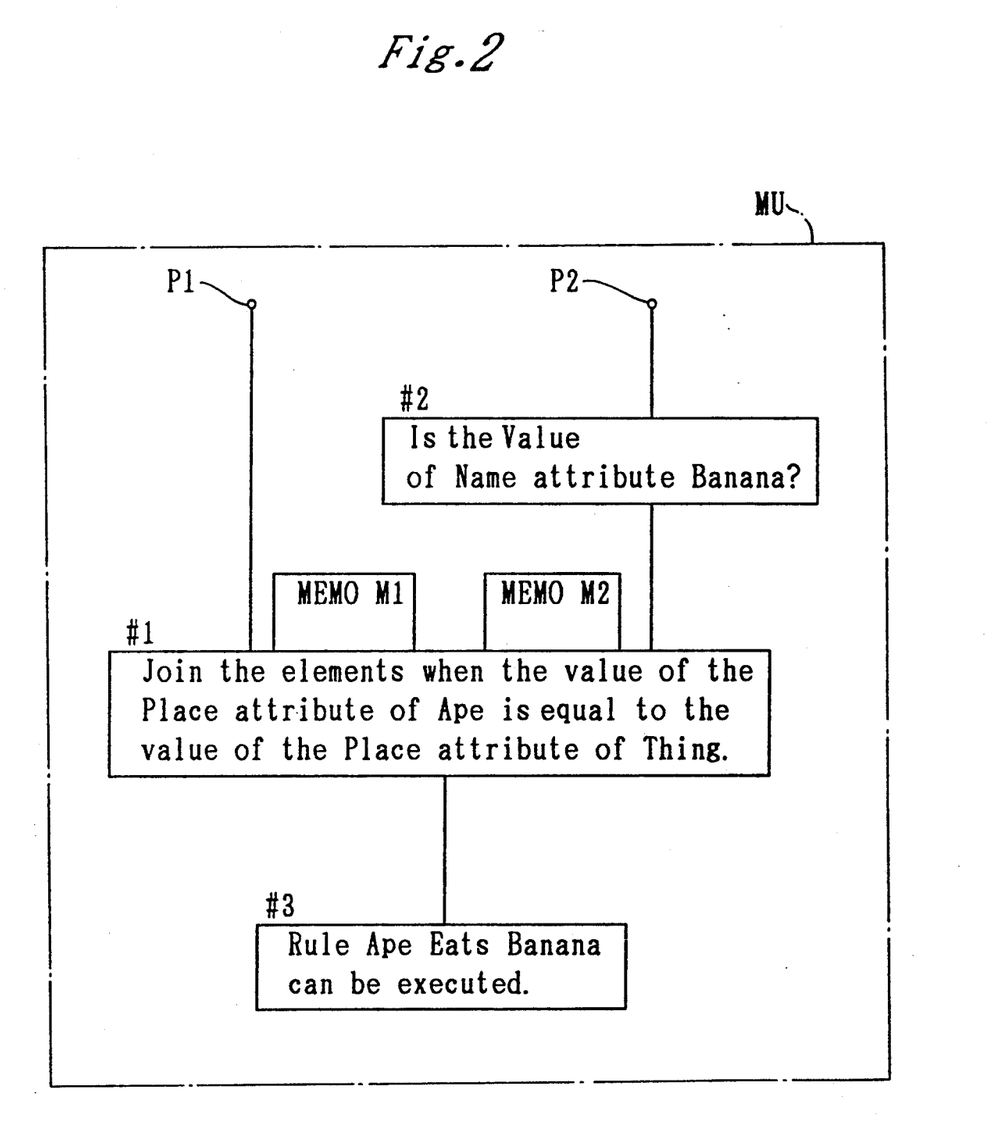
FIG. 2. is a diagrammatic view of the element checking network according to the present invention.

Referring to FIG. 2, an element checking network according to the present invention is shown, which is for the exemplary production rule, Ape Eats Banana, explained above. The network shown in FIG. 2 consists of: value check node #1 having one input P1 for receiving a token from the working memory; attribute check node #2 having one input P2 for receiving a token from the working memory; and terminal node #3. When compared with the prior art checking network of FIG. 1, the checking network of FIG. 2 does not have the distribution node N1 or the element name check nodes N2 and N3 for checking the element name. Instead, the checking network according to the present invention has a plurality of inputs, such as two inputs P1 and P2 shown in FIG. 2. It is to be noted that the element checking network as shown in FIG. 2 is stored in a memory unit MU in a computer.

Figure 3:
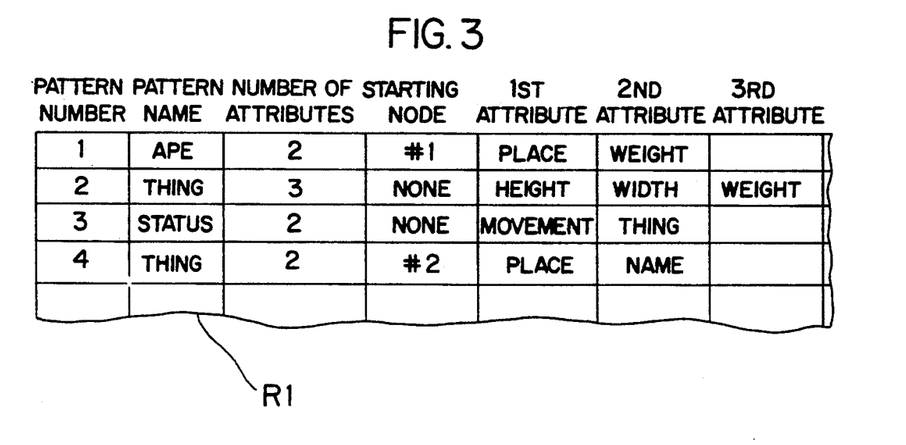
FIG. 3. is a diagrammatic view of a working pattern memory.
Figure 4:
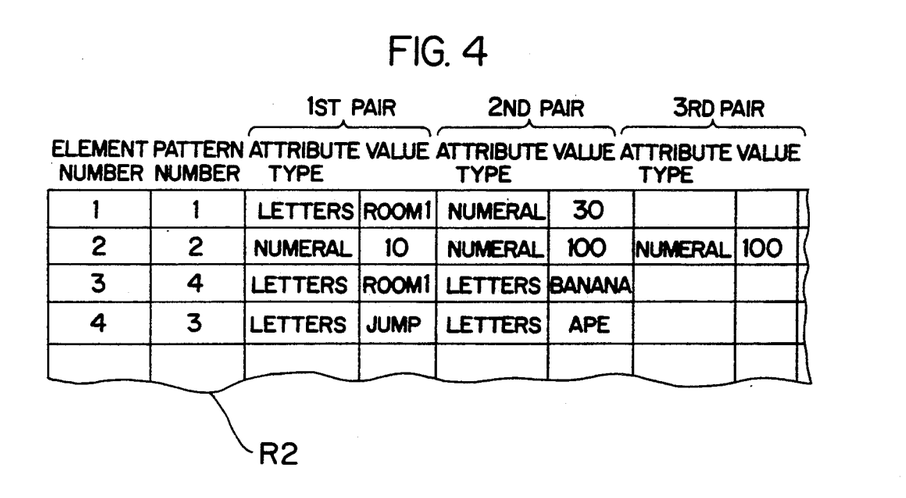
FIG. 4. is a diagrammatic view of a working element memory.

Before starting the check process in the network, a number of elements are prepared and stored in a working memory M2, such as defined by RAM, having column to store various data, as shown in FIG. 4. Each element is formed in accordance with a particular pattern which is stored in memory M1 shown in FIG. 3.

Referring to FIG. 3, a pattern memory M1, such as defined by RAM, is shown which is previously stored with various patterns of the elements. The table shown in FIG. 3 is formed by the literalize statement. In the example shown in FIG. 3, patterns for the elements Ape, Thing and Status, which are already explained above, are stored. In the first column, pattern numbers are given in serial numbers, and in the second column, pattern names are given, such as Ape, Thing and Status. In the third column, a number of attributes are given and in the fourth column, a starting node number is given. In the fifth column, the first attribute name is given, and in the subsequent columns, further attribute names are given.

Pattern number s are sequentially allotted to different patterns. The patterns differ when:
(1) pattern names are different; or
(2) pattern names are the same, but the attributes are different.

Figure 6:
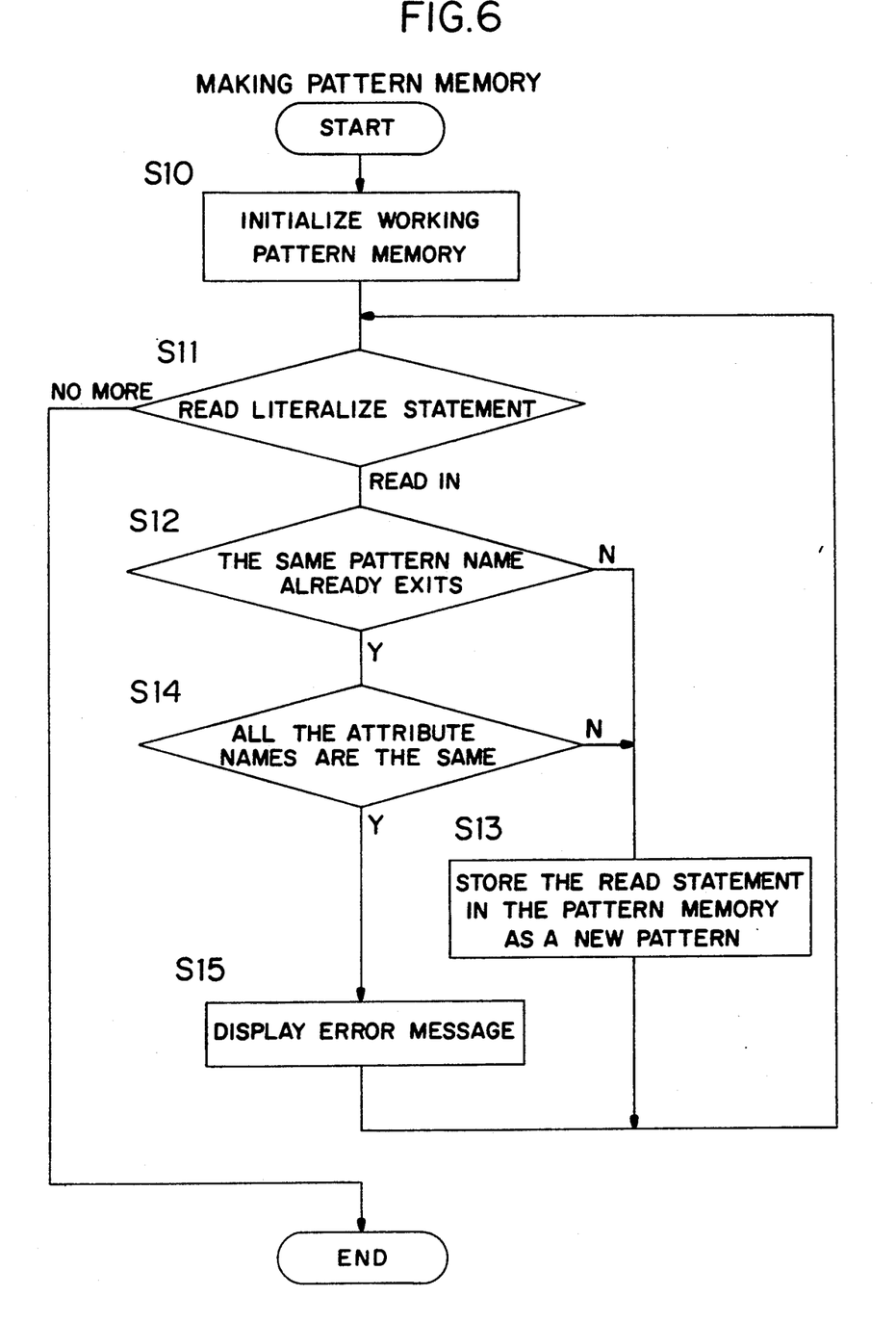
FIG. 6 is a flow chart showing the steps for making a pattern memory.

Referring to FIG. 6, a flow chart for partly making a pattern memory M1 as shown in FIG. 3 is shown. At step S10, pattern memory is initialized. Then, at step S11, it is checked if any non-processed literalize statement is present or not, and if present, the literalize statement is read so as to make one pattern. For example, it is assumed that a pattern with a pattern name "Ape" is formed. Then, it is checked at step S12 whether or not the pattern with the same pattern name "Ape" already exists in pattern memory R1. If the answer is yes, it is further checked at step S14 whether or not the previously stored pattern "Ape" has the same attribute name. If the answer is yes, an error message is produced at step S15 to avoid the pattern memory to store a plurality of identical patterns. If the answer is produced from either step S12 or S14, the program goes to step S13 to effect the storing of the newly produced pattern which in this case is pattern "Ape" in pattern memory R1. Thereafter, the program returns to step S11 to produce the next pattern by the next literalize statement. If there are no more literalize statements, the program of FIG. 6 ends to partly complete the pattern table in pattern memory M1, as shown in FIG. 3. It is to be noted that at this stage, none of the data in the column under the titled "starting node" in FIG. 3 is filled in.

Figure 7:
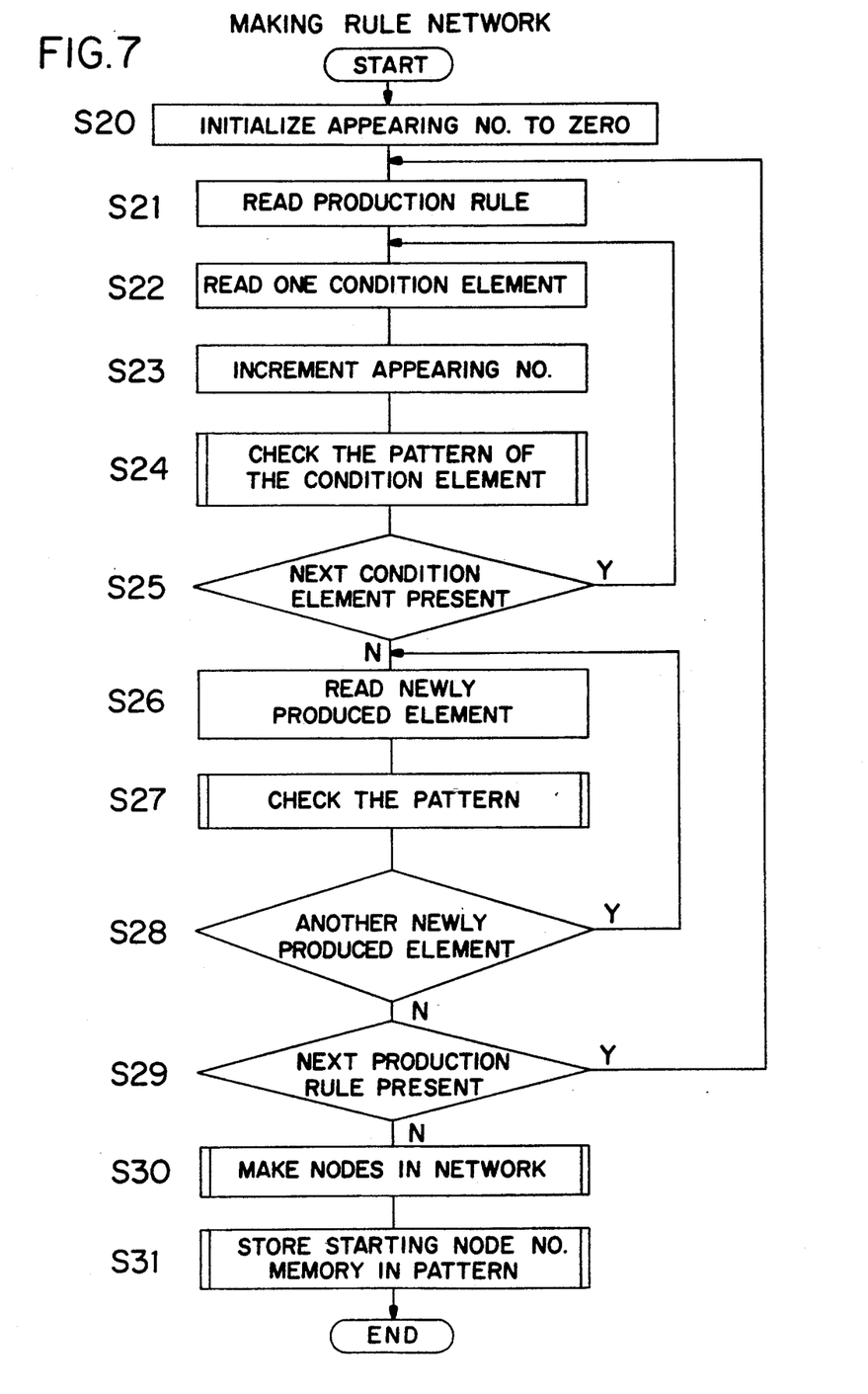
FIG. 7 is a flow chart showing the steps for making a rule network.

Referring to FIG. 7, a flow chart for making a rule network as shown in FIG. 2 is shown. At step S20, an appearing number used in this program is initialized to zero. Then, at step S21, a production rule, such as an IF-THEN statement described above is read. At step S22, one condition element, such as Ape (Place: $ Room), is read and at step S23, an appearing number is increased. In this flow chart the appearing number is increased each time the condition element is read so that condition elements are allotted with serially increasing different appearing numbers. At step S24, the pattern of the condition element is checked using the pattern memory M1 in a manner which will be described in detail later in connection with FIGS. 8 and 9. Then, at step S25, it is checked whether or not, the next condition element is present. If the answer is yes, the program returns to step S22, and if the answer is no, the program advances to step S26.

Figure 8:
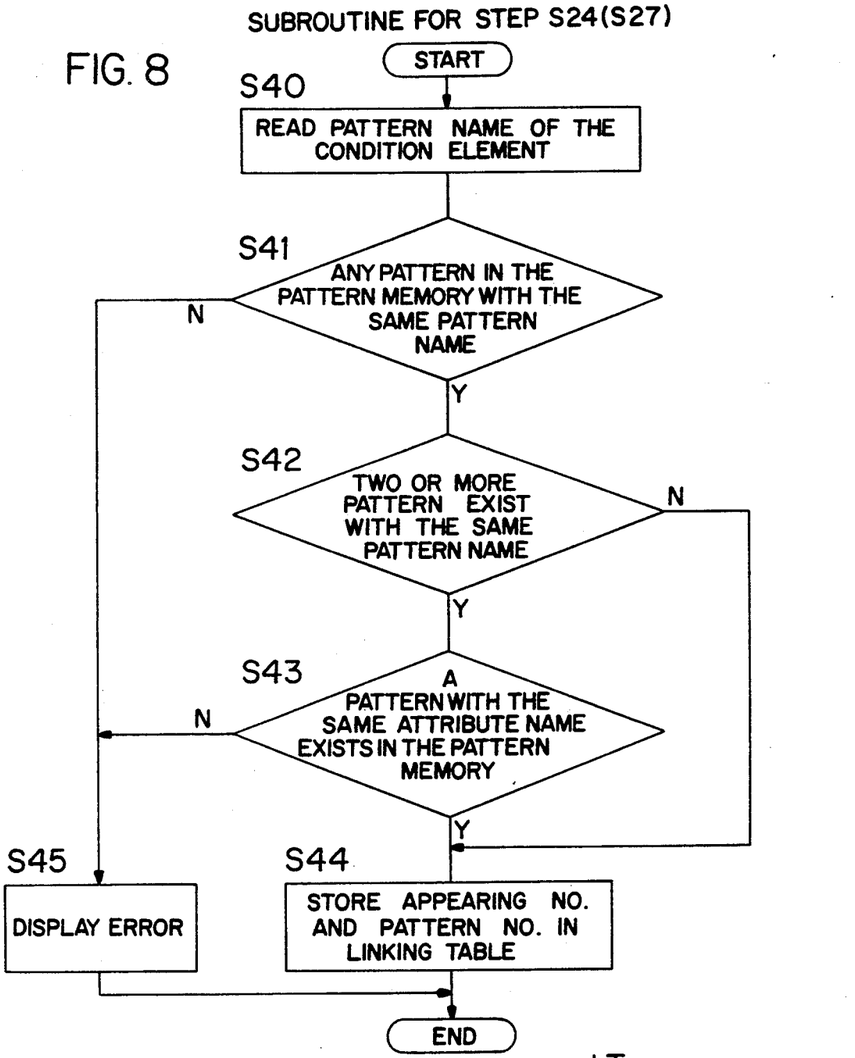
FIG. 8 is a flow chart showing the steps of a subroutine for checking the pattern.

At step S26, a new element produced as a result of the IF-THEN statement is read in. Thereafter, at step S27, the pattern of the new element is checked in a similar manner to that carried out in step S24 (FIG. 8). Then, at step S28, it is checked if as to whether or not other new element is present or not. If the answer is yes, the program returns to step S26 and, if the answer is no, the program advances to step S29 at which the presence of the next production rule is checked. If more production rule exists, the program returns to step S21, and if not, the program goes to step S30.

At step S30, nodes are made in the network, and at step S31, starting node numbers are stored in the table of pattern memory M1 to complete the pattern table, as shown in FIG. 3. The detail of step S30 and step S31 will be described later in connection with FIG. 10 and FIG. 11, respectively.

Figure 9:
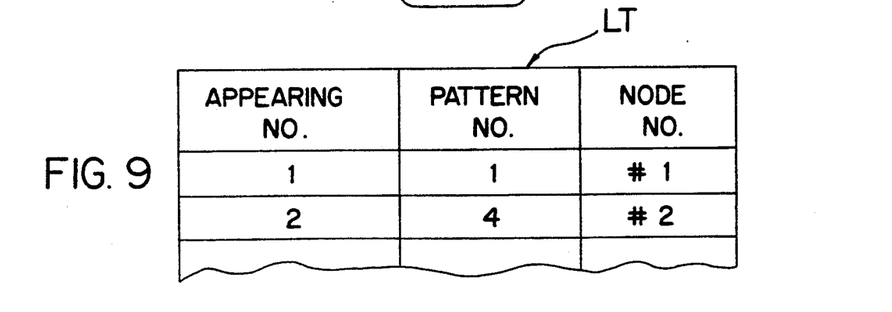
FIG. 9 is a diagrammatic view of a linking table.

Referring to FIG. 8, a subroutine for step S24 for checking the pattern of the condition element is shown. At step S40, the pattern name of the condition element is read together with the appearing number given to that condition element at step S23. Then, it is checked in the pattern table of FIG. 3 whether or not a pattern having the same pattern name as that of the condition element is listed in the pattern table. If the answer is yes, the program goes to step S42 at which teh number of such pattern with the same pattern name is checked. If two or more patterns having the same pattern name as that of the condition element are found, the program goes to step S43 to check the attribute name to find one pattern in the table which has an identical pattern with the pattern of the condition element. At step S42, if only one pattern with the same pattern name as that of the condition element is detected in the pattern table, the detected pattern is regarded as having an identical pattern with that of the condition element. When the identical pattern is detected at step S42 or S43, the program advances to step S44 at which time the appearing number of the condition element as allotted at step S23 and the pattern number of the detected pattern are stored in a linking table LT in a mutually linked manner, such as a side-by-side relationship, as shown in FIG. 9.

According to the example given above, the first condition element that enters the flow chart at step S22 is "Ape (Place: $ Room)" in the IF-THEN rule called "Ape Eats Banana", and to this condition element, appearing number 1 is allotted. Then, at steps S41, S42 and S43, the first pattern with pattern number 1 in the pattern table of FIG. 3 is detected as having the identical pattern with that of the entered condition element. Thus, appearing number 1 and pattern number 1 are stored in the linking table LT in mutually linked manner, as shown in FIG. 9.

Furthermore, when the second condition element "Thing (Name: Banana, Place: $ Room)" enters the flow chart, appearing number 2 is allotted at step S23, and pattern number 4 is detected at steps S41, S42 and S43. Accordingly, numbers 2 and 4 are stored in the linking table as shown in FIG. 9.

It is to be noted that step S27 for checking the pattern of the newly produced element has a subroutine similar to that shown in FIG. 8. Therefore, the detailed description therefor is omitted.

Figures 10, 10A:
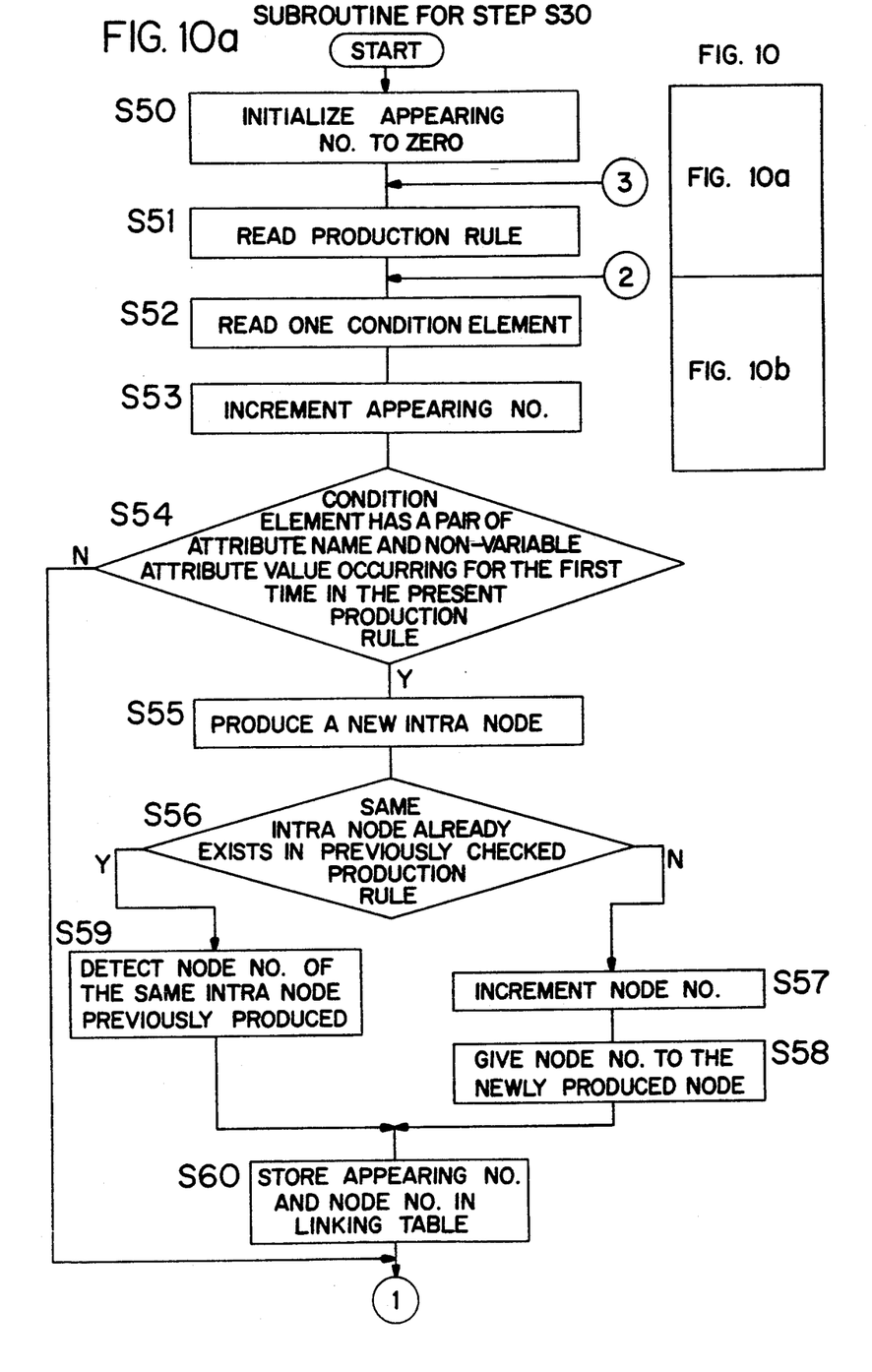
Figure 10B:
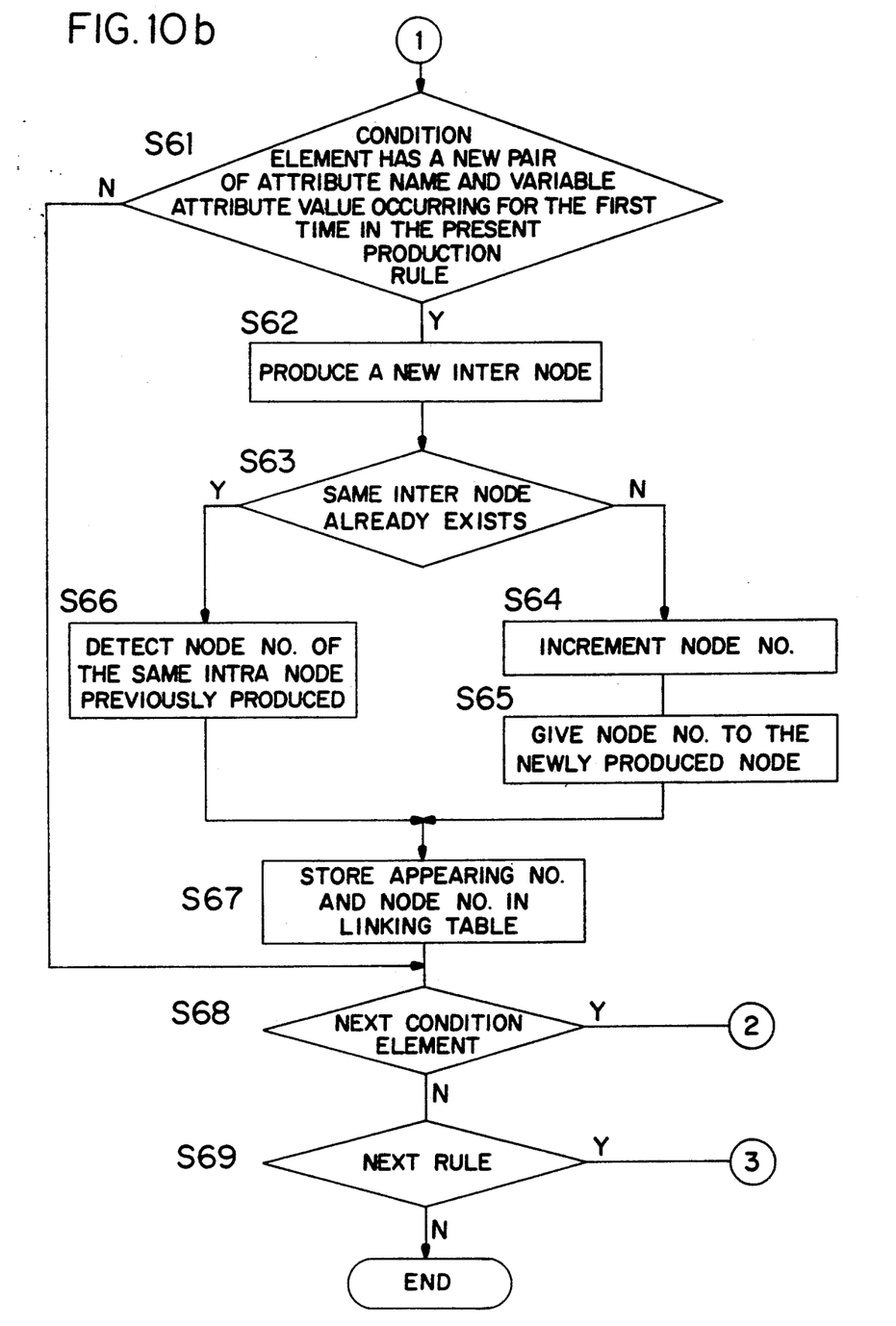

Referring to FIGS. 10a and 10b, taken together as shown in FIG. 10, a subroutine for step S30 for making nodes in the network is shown. At step S50, the appearing number and node number are initialized to zero. Steps S51, S52 and S53 are similar to steps S21, S22 and S23. Thus, at step S51 a production rule is read, at step S52 one condition element is read, and at step S52 appearing number is increased. At step S54, the entered condition element is checked as to whether or not it has a pair of attribute name and non-variable attribute value occurring for the first time in the present production rule. According to the above example, the first entered condition element is "Ape (Place: $ Room)" which is allotted with appearing number 1. Since this condition element has a pair of attribute name and variable attribute value, the program advances to step S61. Then, at step S61, the condition element is further checked as to whether or not it has a pair of attribute name and variable attribute value occurring for the first time in the present production rule. Since the entered condition element "Ape (place: $ Room)" satisfies this check, the program advances to step S62. At step S62, a new inter node is made in a known manner. Then, at step S63, it is checked as to whether or not the same inter node is already made in the previous cycle. If the answer is yes, the node number of such a previously made inter node is detected st step S66. In this case, since the node is made for the first time, the program goes to step S64 at which time the node number is increased from 0 to 1. Then, at step S65, the node number is given to the newly produced node. Thereafter, at step S67, the node number as detected at step S66 or the newly allotted node number at step S65 is stored in the linking table LT in linked manner with the apparent number of the present condition element. Thus, in the present example, node number #1 is stored in linking table LT in a linked manner with appearing number 1, as shown in FIG. 9. Then, at steps S68 the next condition element enters if it is present, and if not the program goes to step S69 the next rule enters if it is present. Since in the present example, the next condition element "Thing (Name: Banana, Place: $ Room)" is present, the program returns to step S52 to read the next condition element.

At this time, at step S53, the appearing number is increased to 2. Then at step S53, since the next condition element "Thing (Name: Banana, Place: $ Room)" has a pair of attribute name and non-variable attribute value occurring for the first time in the present production rule, the program proceed to step S55. At step S55, a new intra node is produced in the known manner. Then, at step S56, it is checked as to whether or not the same intra node already made in the previous cycle. If the answer is yes, the node number of such previously made intra node is detected at step S59. In this case, since the intra node is made for the first time, the program goes to step S57 at which the node number is increased from 1 to 2. Then, at step S58, the node number is given to the newly produced node. Thereafter, at step S60, the node number as detected at step S59 or the newly allotted node number at step S58 is stored in the linking table LT in linked manner with the apparent number of the present condition element. Thus, in the present example, node number #2 is stored in linking table LT in a linked manner with appearing number 2, as shown in FIG. 9.

Thus, by the flow chart of FIG. 10, various nodes are made and, at the same time, each condition element is added with node number in a linked manner with the appearing number.

Figure 11:
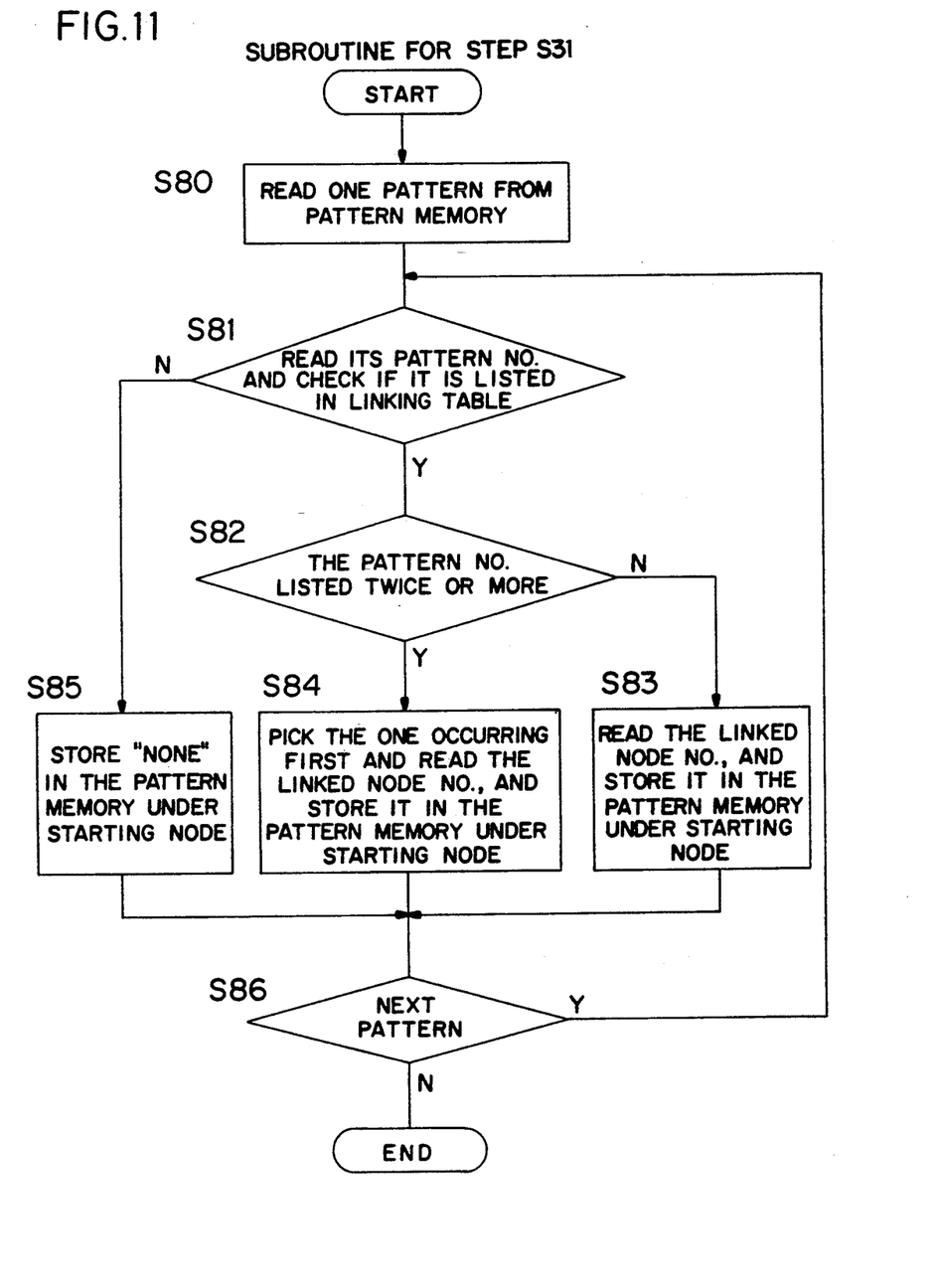
FIG. 11 is a flow chart showing a subroutine for storing the starting node number in pattern memory.

Referring to FIG. 11, a subroutine for step S31 for storing starting node number in the pattern memory is shown. At step S80, one pattern is read from the pattern memory from the top row. Thus, in the first cycle, the first pattern appearing in the patten table of FIG. 3 is read. Then, at step S81, the pattern number, in this case, pattern number 1, is read and it is checked in the linking table LT as to whether or not such a pattern number is listed. If not, the program goes to step S85 to store "NONE" in the pattern table of FIG. 3 in the column under the title "starting node". If the answer is yes at step 81, the program advances to step S82 at which it is checked if the detected pattern number occurs twice or more. If the answer yes, the program goes to step S84 at which the pattern number occurring first is detected and the node number linked to that pattern number is read out from the linking table LT. If not at step S82, the program goes to step S83 at which the node number linked with the pattern number is detected. In this case, the node number #1, which is linked with pattern number 1, is detected and is stored in the pattern memory in the column under the title starting node. Thereafter, the next pattern is processed.

In this manner, the starting node number or NONE is added in the pattern table of FIG. 3 to each pattern.

In summary, the rule network memory of FIG. 2 and the pattern memory of FIG. 3 are formed when the literalize statement is carried out and when the production rule is read in the system as explained below.

(1) Read the literalize statement and store the pattern name and attribute name in the pattern memory.

(2) Read the production rule statement and form the network in the known manner.

(3) Check each pattern in the pattern memory to find which one of the nodes in the network formed in step (2) is the starting node, and there after, store the detected node in the pattern memory under a column "starting node" (FIG. 3).

(4) Store the pattern number formed in step (2) also for the element which will be used in the newly produced element.

Thus, by the data stored in memory R1, it is understood that the element APE always has two attributes, Place and Weight, and that it always starts from node #1 in the network of FIG. 2 for the check process. Similarly, the element Thing has two attributes, Place and Name, and its starting point for the check process in the network of FIG. 2 is node #2; further, the element status has two attributes, Movement and Thing, and its starting point is none, meaning that this element will not be checked through the network.

Based on the observed facts, the operator stores elements in working memory R2 shown in FIG. 4. For example, when the operator sees a 30 kg ape in a room, he inputs the data in a computer which will be stored as an element Ape in the working memory R2 in FIG. 4. The data stored in memory R2, first row, indicates that the inputted element is the first element having an element pattern number 1, and that the first attribute type is expressed in letters such that its value being room 1, and the second attribute type is expressed in numeral such that its value being 30. The data in working memory R2 may be produced by way of external input operation, such as by key input, or by way of internal input operation, such as by the result of proceeding the production rule.

The first, second, third and fourth elements stored in the working memory R2 can be generally expressed as follows.

Ape (Place: Room 1, weight: 30 kg)
Thing (Height: 10, Width: 100, Weight 100)
Thing (Place: Room 1, Name: banana)
Status (Movement: Jump, Thing: Ape).

When these elements are needed to be checked through the network of FIG. 2, the data stored in memory R1 informs the position in the network where to start the check process. For example, when the element number 1 is read out as a token and is to be applied to the network, it is directly applied to node #1 through input P1. This is because the data stored in memory R1 specifies that the element Ape should start from node #1. Similarly, when the element number 2 is read out as token and is to be applied to the network, it is expelled without entering the network. This is because the data stored in memory R1 informs that the element Thing which has three attributes (Height, Width and Weight) need not be checked. Furthermore, when the element number 3 is read out as a token and is to be applied to the network, it is directly applied to node #2 through input P2; This is because the data stored in memory R1 specifies that the element Thing which has two attributes (Name and Place) should start from node #2.

The token which has entered the network is checked in the same manner described above in connection with FIG. 1. More specifically, if the entered token has the element name, Ape, the token is applied directly through input P1 to node #1 at which a code representing the element Ape is stored in memory M1 subsequently, the token is expelled from the network since there is no element Thing stored therein to carry out the check of node N5.

If the next entered token has the element name, Thing with the two attributes, the token is applied directly through input P2 to node #2 at which the attribute type is checked. If the value of Name attribute is Banana, the token is further transferred to node #1, at which a code representing the element Thing is stored in memory M2. Subsequently, it is checked as to whether or not the value of the Place attribute of the element Ape, which is called by the code stored in memory M1, is equal to the value of the Place attribute of the element Thing. When these Place attributes have the same value, such as Room 1, these elements are joined so as to enable the execution of the production rule "Ape Eats Banana".

If a rule "Ape eats Banana" is executed, a new element,

Status (Movement: eat, Thing: Banana), will be produced and stored as the result of the execution of the rule, and will be added and stored in the working element memory as shown in FIG. 4.

Since the pattern number of this new element can be easily detected by checking the working pattern memory shown in FIG. 3 at the time when storing the production rule, when it comes time to execute the newly produced element by the execution of the rule, the working memory R2 shown in FIG. 2 can be informed without referring the working memory.

Thus, the newly produced element can be checked in the network immediately.

Thus, according to the forward inference system of the present invention, the element check is carried out such that the token enters the network directly at the node for checking the attribute name or attribute value. There is no node for distributing the token or nodes for finding the correct element name. Thus, by the element checking system of the present invention, it takes only a very short time for the network to produce a decision, resulting in fast forward inference procedure.

Figure 5:
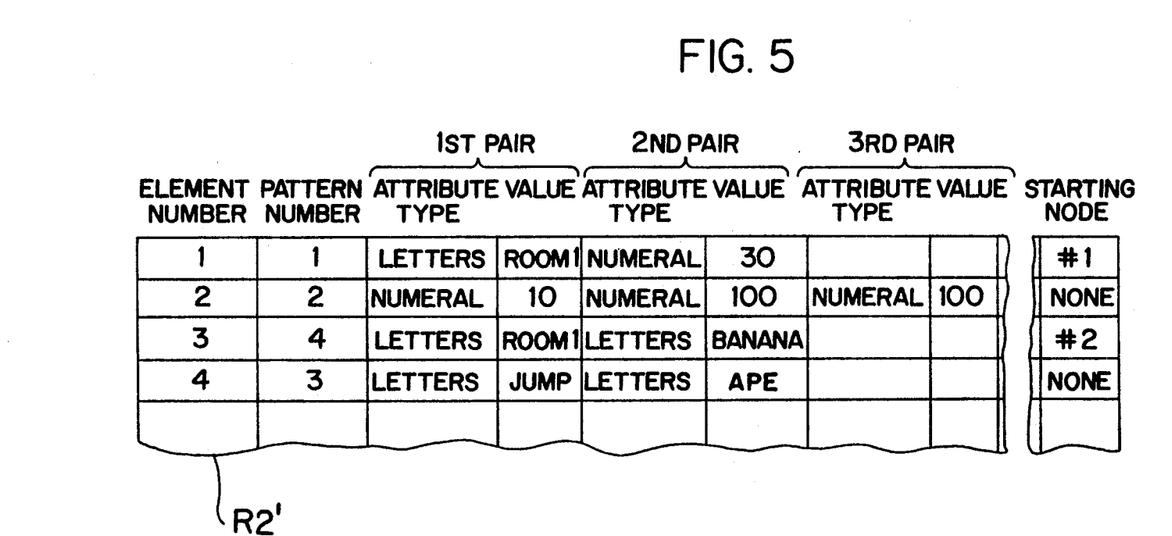
FIG. 5 is a view similar to FIG. 4, but showing a modification thereof.

Referring to FIG. 5, a modification of the working memory R2' is shown which has another column, such as shown at the right hand side end in FIG. 5, for storing the node number from which the token should enter the network. When working memory R2' is used, it is not necessary to refer to memory R1 to obtain data for the starting node number.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A method for creating an element checking network for use in a forward inference system comprising the steps of:
   (a) creating a pattern table including items of at least pattern number, pattern name and attribute name for at least one pattern and storing the pattern table in a memory;
   (b) reading at least one of a plurality of rules from a memory, each rule including at least one condition element;
   (c) assigning an appearing number to each condition element;
   (d) locating a pattern number for each condition element in the pattern table;
   (e) linking the appearing number and corresponding pattern number for each condition element;
   (f) reading at least one of a plurality of rules for a second time;
   (g) assigning an appearing number to each condition element in the read rule;
   (h) forming a node each time a condition element with a pair, including an attribute name and an attribute value, occur for a first time when a present rule is read;
   assigning to each condition element a new node number when a new node is formed, or assigning a previously set node number when a node identical to a previously formed node is formed;
   (j) linking the appearing number and corresponding node number for each condition element so as to find a relationship between the pattern number and the node number; and
   (k) storing the linked node number as a starting node number in the pattern table for each pattern.

2. The method as claimed in claim 1, wherein said step (h) for forming a node comprises:
   (1) forming an intra node each time a condition element with a pair including an attribute name and a nonvariable attribute value is read; and
   (2) forming an inter node each time a condition element with a pair including an attribute name and a variable attribute value is read.

3. The method as claimed in claim 1, wherein said steps (e) and (j) for linking the appearing number, pattern number and node number are affected by forming a linking table and storing the linking table in the memory.

* * * * *